United States Patent
Ivanisov et al.

(10) Patent No.: US 9,946,943 B2
(45) Date of Patent: Apr. 17, 2018

(54) METHODS AND APPARATUSES FOR BIREFRINGENCE BASED BIOMETRIC AUTHENTICATION

(71) Applicant: DELTA ID, INC., Fremont, CA (US)

(72) Inventors: Alexander Ivanisov, Newark, CA (US); Salil Prabhakar, Fremont, CA (US)

(73) Assignee: Delta ID, Inc., Fremont, CA (US)

( * ) Notice: Subject to any disclaimer, the term of this patent is extended or adjusted under 35 U.S.C. 154(b) by 0 days.

(21) Appl. No.: 15/375,445

(22) Filed: Dec. 12, 2016

(65) Prior Publication Data
US 2017/0161578 A1    Jun. 8, 2017

Related U.S. Application Data

(63) Continuation of application No. PCT/US2016/065337, filed on Dec. 7, 2016.

(60) Provisional application No. 62/264,016, filed on Dec. 7, 2015.

(51) Int. Cl.
G06K 9/00    (2006.01)

(52) U.S. Cl.
CPC ..... G06K 9/00899 (2013.01); G06K 9/00604 (2013.01); G06K 9/00617 (2013.01)

(58) Field of Classification Search
None
See application file for complete search history.

(56) References Cited

U.S. PATENT DOCUMENTS

| 8,760,614 B2* | 6/2014 | Delbaere | G02B 5/3016 |
| | | | 349/123 |
| 2004/0061834 A1 | 4/2004 | Zhou et al. | |
| 2005/0180620 A1* | 8/2005 | Takiguchi | G06K 9/00013 |
| | | | 382/128 |
| 2006/0283952 A1* | 12/2006 | Wang | G06K 7/10722 |
| | | | 235/462.01 |

(Continued)

FOREIGN PATENT DOCUMENTS

WO    200101329 A1    1/2001

OTHER PUBLICATIONS

International Search Report and Written Opinion for corresponding PCT Application No. PCT/US2016/065337 dated Apr. 6, 2017.

*Primary Examiner* — Matthew Bella
*Assistant Examiner* — Brian Shin
(74) *Attorney, Agent, or Firm* — Budzyn IP Law, LLC

(57) ABSTRACT

The invention relates to technologies for eye based biometric authentication. The invention provides methods, apparatuses and computer programs for initiating an action based on characteristics of acquired biometric information. In an embodiment, the invention comprises (i) receiving at least one image comprising an image of at least part of an eye, (ii) determining whether the at least part of an eye has birefringent characteristics, and (iii) initiating a predefined action responsive to (a) the at least part of an eye exhibiting birefringent characteristics that are inconsistent with a predefined set of birefringent characteristics or (b) a determined lack of birefringent characteristics typical of a real eye, wherein the predefined action comprises any one or more of denying biometric enrollment, denying biometric authentication, denying access to a resource, denying a request for unlocking of a resource, or transmitting or recording information identifying a spoof.

13 Claims, 13 Drawing Sheets

| ILLUMINATOR | REAL EYE | SPOOF |
|---|---|---|
| Image acquired under illumination from a first illuminator | | |
| Image acquired under illumination from a second illuminator | | |

(56) References Cited

U.S. PATENT DOCUMENTS

| | | |
|---|---|---|
| 2010/0310133 A1 | 12/2010 | Mason et al. |
| 2014/0294252 A1 | 10/2014 | Derakhshani et al. |
| 2015/0285977 A1 | 10/2015 | Delbaere et al. |
| 2015/0294464 A1* | 10/2015 | Kim .................. G06K 9/00597 382/117 |
| 2016/0019421 A1* | 1/2016 | Feng .................. G06K 9/00604 382/117 |

* cited by examiner

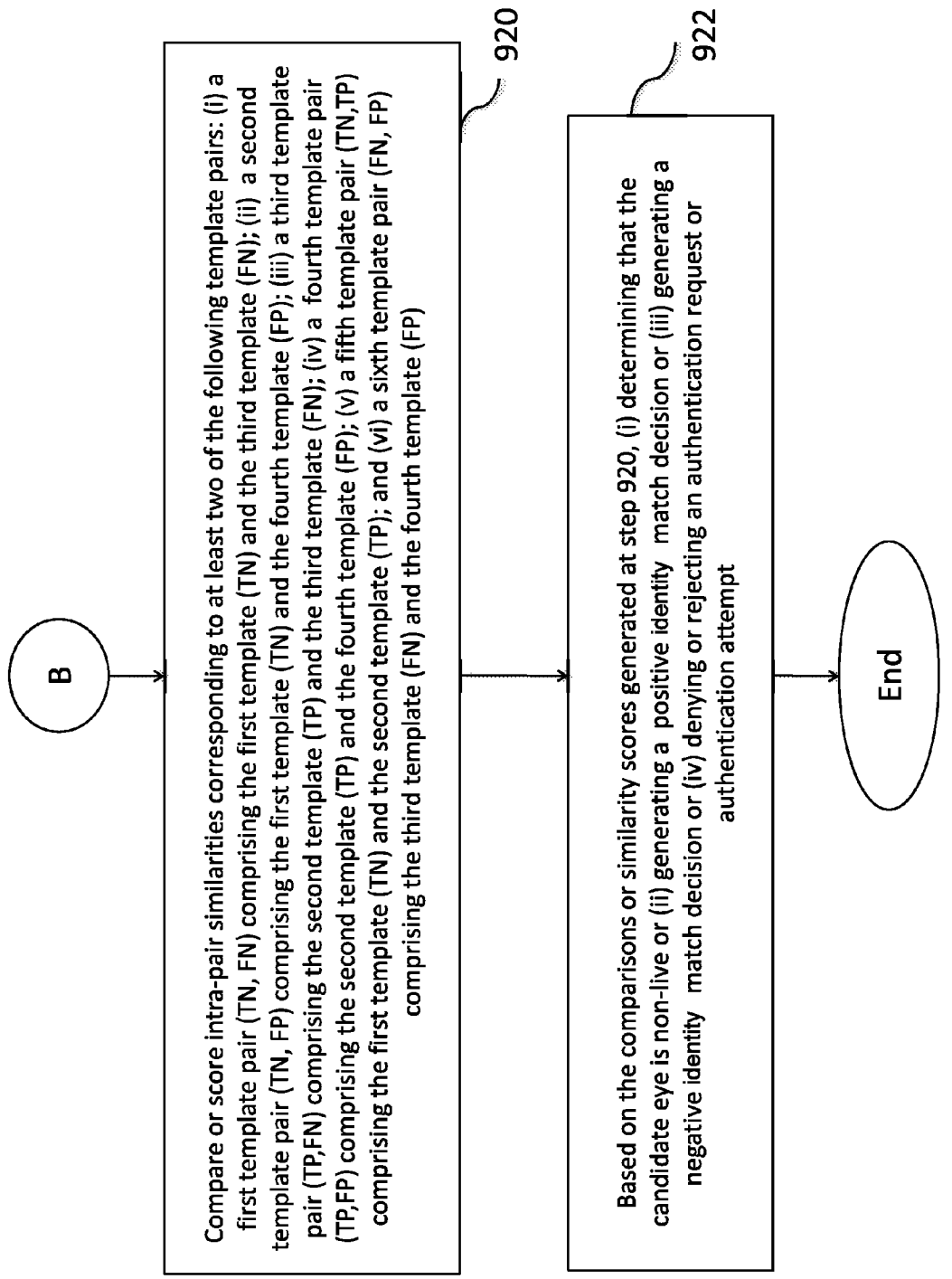

METHODS AND APPARATUSES FOR BIREFRINGENCE BASED BIOMETRIC AUTHENTICATION

CROSS-REFERENCES TO RELATED APPLICATIONS

This application is a continuation of PCT Application No. PCT/US2016/065337, filed Dec. 7, 2016, which claims priority to U.S. Provisional Patent Application No. 62/264,016, filed Dec. 7, 2015, the contents of which are incorporated by reference herein.

FIELD OF THE INVENTION

The present invention relates to technologies for eye based biometric authentication.

BACKGROUND

Biometric information extracted from a subject's eye (for example, from a subject's iris or retina) may be used to identify or authenticate the subject. Biometric systems in general, and eye based systems in particular are vulnerable to spoofing—wherein an entity attempts to bypass or deceive the biometric system by presenting to the biometric sensor, something other than a live subject. In the case of eye based biometric systems, spoofing attempts may include presenting a picture or image of a registered subject's eye to the biometric system—in an attempt to generate a false match and gain unauthorized access.

There is a need for technology that enables eye based biometric systems to differentiate between a real (or live) eye and a spoof (or fake) eye that may be presented to an imaging system for authentication purposes.

SUMMARY

The invention provides a method for selecting a system response based on characteristics of acquired biometric information, comprising the steps of: (i) receiving at least one image comprising an image of at least part of an eye, (ii) determining whether the at least part of an eye has birefringent characteristics, (iii) selecting a system response, wherein said selection depends on (a) whether the at least part of an eye exhibits birefringent characteristics that are inconsistent with a predefined set of birefringent characteristics or (b) whether the at least part of any eye exhibits a lack of birefringent characteristics typical of a real eye.

The present invention also includes a method for initiating an action based on characteristics of acquired biometric information. In an embodiment, the invention comprises (i) receiving at least one image comprising an image of at least part of an eye, (ii) determining whether the at least part of an eye has birefringent characteristics, and (iii) initiating a predefined action responsive to (a) the at least part of an eye exhibiting birefringent characteristics that are inconsistent with a predefined set of birefringent characteristics or (b) a determined lack of birefringent characteristics typical of a real eye. The predefined action may comprise any one or more of denying biometric enrollment, denying (or rejecting or failing) biometric authentication, denying (or rejecting or failing) access to a resource, denying (or rejecting or failing) a request for unlocking of a resource, or transmitting or recording information identifying a spoof.

In an embodiment, the predefined action comprises denying access to a mobile communication device or an automobile, or to any hardware component or software module.

In a particular embodiment, the at least one eye image is acquired by an image sensor based on polarized light emitted from an illumination source configured to direct polarized light on the at least part of an eye.

In another embodiment, the at least one eye image is acquired by an image sensor comprising pixels exhibiting selectivity to polarization characteristics of incident light.

The invention additionally includes a method for obtaining biometric reference information associated with a subject, for use in biometric comparison operations or for biometric enrollment. In an embodiment, the method comprises (i) acquiring a first set of image information (TN) corresponding to at least part of an eye, wherein the first set of image information excludes image information corresponding to artefacts arising from birefringence in a real cornea; (ii) acquiring a second set of image information (TP) corresponding to at least part of an eye, wherein the second set of image information includes image information corresponding to artefacts arising from birefringence in a real cornea; and (iii) associating said first and second sets of image information (TN, TP) with a subject to whom the at least part of an eye corresponds.

In embodiments, the first set of image information (TN) and the second set of image information (TP) are derived from the same image. In specific embodiments, the first set of image information (TN) and the second set of image information (TP) are derived from the same image by image processing.

In an embodiment, one or both of the first and second sets of biometric information (TN, TP) is used for biometric comparison.

The invention also comprises a method for biometric authentication. In an embodiment, the method comprises retrieving at least one of (i) a first set of image information (TN) corresponding to at least part of an eye, wherein the first set of image information excludes image information corresponding to artefacts arising from birefringence in a real cornea; and (ii) a second set of image information (TP) corresponding to the at least part of an eye, wherein the second set of image information includes image information corresponding to artefacts arising from birefringence in a real cornea; (iii) acquiring a third set of image information (FN) corresponding to at least part of an eye, wherein the third set of image information excludes image information corresponding to artefacts arising from birefringence in a real cornea; (iv) acquiring a fourth set of image information (FP) corresponding to at least part of an eye, wherein the fourth set of image information includes image information corresponding to artefacts arising from birefringence in a real cornea; and (v) generating at least one of an identity decision or authentication decision based on intra-pair comparisons between sets of image information within at least two of the following pairs of sets of image information: (a) a first image information pair (TN, FN) comprising the first set of image information (TN) and the third set of image information (FN); (b) a second image information pair (TN, FP) comprising the first set of image information (TN) and the fourth set of image information (FP); (c) a third image information pair (TP,FN) comprising the second set of image information (TP) and the third set of image information (FN); (d) a fourth image information pair (TP,FP) comprising the second set of image information (TP) and the fourth set of image information (FP); (e) a fifth image information pair (TN,TP) comprising the first set of image information (TN) and the second set of image information (TP); and (f) a sixth image information pair (FN, FP) comprising the third set of image information (FN) and the fourth set of image information (FP).

In an embodiment, the generated identity decision or authentication decision is based on one or more of (i) determining a similarity score (A) representative of intra-pair similarities corresponding to the first image information pair (TN, FN); (ii) determining a similarity score (B) representative of intra-pair similarities corresponding to the third image information pair (TP, FN); and (iii) determining a similarity score (C) representative of intra-pair similarities corresponding to second image information pair (TN, FP).

In another embodiment, the invention comprises the step of rejecting an authentication request responsive to any one or more of (i) similarity score (C) exceeding a predetermined threshold score; and (ii) non-occurrence of one or more of the following conditions, (a) A>T; and (b) (C+D) <E, wherein E corresponds to the minimum value among A and B; and wherein (c) T and D respectively comprise predefined threshold values.

In a more particular embodiment, (i) D≥0, and/or (ii) T≥0.

The invention additionally includes an apparatus for biometric authentication. The apparatus includes an imaging apparatus comprising an image sensor and a processor.

In an embodiment, the processor is configured for (i) receiving at least one image comprising an image of at least part of an eye, (ii) determining whether the at least part of an eye has birefringent characteristics, and (iii) initiating a predefined action responsive to (a) the at least part of an eye exhibiting birefringent characteristics that are inconsistent with a predefined set of birefringent characteristics or (b) a determined lack of birefringent characteristics typical of a real eye, wherein the predefined action comprises any one or more of denying (or rejecting or failing) biometric enrollment, denying (or rejecting or failing) biometric authentication, denying (or rejecting or failing) access to a resource, denying (or rejecting or failing) a request for unlocking of a resource, or transmitting or recording information identifying a spoof.

In an embodiment, an illumination source is configured to direct polarized light on the at least part of an eye.

In another embodiment, the image sensor comprises pixels having selectivity to polarization characteristics of incident light.

The apparatus may comprise at least one polarizing filter interposed between an intersection of a field of view region and a depth of field region corresponding to the imaging apparatus and (i) the illumination source or (ii) the image sensor.

The invention also comprises an apparatus for obtaining biometric reference information associated with a subject, for use in biometric comparison operations. The apparatus includes an imaging apparatus comprising an image sensor and a processor. In an embodiment, the processor is configured for (i) acquiring a first set of image information (TN) corresponding to at least part of an eye, wherein the first set of image information excludes image information corresponding to artefacts arising from birefringence in a real cornea; (ii) acquiring a second set of image information (TP) corresponding to at least part of an eye, wherein the second set of image information includes image information corresponding to artefacts arising from birefringence in a real cornea; and (iii) associating said first and second sets of image information (TN, TP) with a subject to whom the at least part of an eye corresponds.

The invention further comprises an apparatus for biometric authentication or identification. The apparatus includes an imaging apparatus comprising an image sensor and a processor. In an embodiment, the processor is configured for retrieving at least one of, (i) a first set of image information (TN) corresponding to at least part of an eye, wherein the first set of image information excludes image information corresponding to artefacts arising from birefringence in a real cornea; and (ii) a second set of image information (TP) corresponding to the at least part of an eye, wherein the second set of image information includes image information corresponding to artefacts arising from birefringence in a real cornea; (iii) acquiring a third set of image information (FN) corresponding to at least part of an eye, wherein the third set of image information excludes image information corresponding to artefacts arising from birefringence in a real cornea; (iv) acquiring a fourth set of image information (FP) corresponding to at least part of an eye, wherein the fourth set of image information includes image information corresponding to artefacts arising from birefringence in a real cornea; and (v) generating at least one of an identity decision or authentication decision based on intra-pair comparisons between sets of image informations within at least two of the following pairs of sets of image information: (a) a first image information pair (TN, FN) comprising the first set of image information (TN) and the third set of image information (FN); (b) a second image information pair (TN, FP) comprising the first set of image information (TN) and the fourth set of image information (FP); (c) a third image information pair (TP,FN) comprising the second set of image information (TP) and the third set of image information (FN); (d) a fourth image information pair (TP,FP) comprising the second set of image information (TP) and the fourth set of image information (FP); (e) a fifth image information pair (TN,TP) comprising the first set of image information (TN) and the second set of image information (TP); and (f) a sixth image information pair (FN, FP) comprising the third set of image information (FN) and the fourth set of image information (FP).

The invention includes a computer program product for biometric enrollment or biometric authentication, comprising a non-transitory computer usable medium having a computer readable program code embodied therein, the computer readable program code comprising instructions for: (i) receiving at least one image comprising an image of at least part of an eye, (ii) determining whether the at least part of an eye has birefringent characteristics; (iii) selecting a process flow, wherein said selection depends on (a) whether the at least part of an eye exhibits birefringent characteristics that are inconsistent with a predefined set of birefringent characteristics or (b) whether the at least part of any eye exhibits a lack of birefringent characteristics typical of a real eye.

The invention also comprises a computer program product for biometric enrollment or biometric authentication, comprising a non-transitory computer usable medium having a computer readable program code embodied therein, the computer readable program code comprising instructions for (i) receiving at least one image comprising an image of at least part of an eye; (ii) determining whether the at least part of an eye has birefringent characteristics; and (iii) initiating a predefined action responsive to (a) the at least part of an eye exhibiting birefringent characteristics that are inconsistent with a predefined set of birefringent characteristics or (b) a determined lack of birefringent characteristics typical of a real eye, wherein the predefined action comprises execution of instructions for any one or more of denying biometric enrollment, denying biometric authentication, denying access to a resource, denying a request for unlocking of a resource, or transmitting or recording information identifying a spoof.

DESCRIPTION OF THE ACCOMPANYING DRAWINGS

FIGS. 8 and 9A to 9C illustrate method embodiments in accordance with the present invention.

DETAILED DESCRIPTION OF THE INVENTION

The invention enables eye based biometric systems to determine whether an eye presented for biometric authentication is real or fake.

Birefringence is an optical property of materials having a refractive index that depends on the polarization and/or direction of propagation of incident light. Such materials are birefringent or birefractive. It has been discovered that tissue within the human eye (particularly the cornea) is birefringent.

Figure 1A:
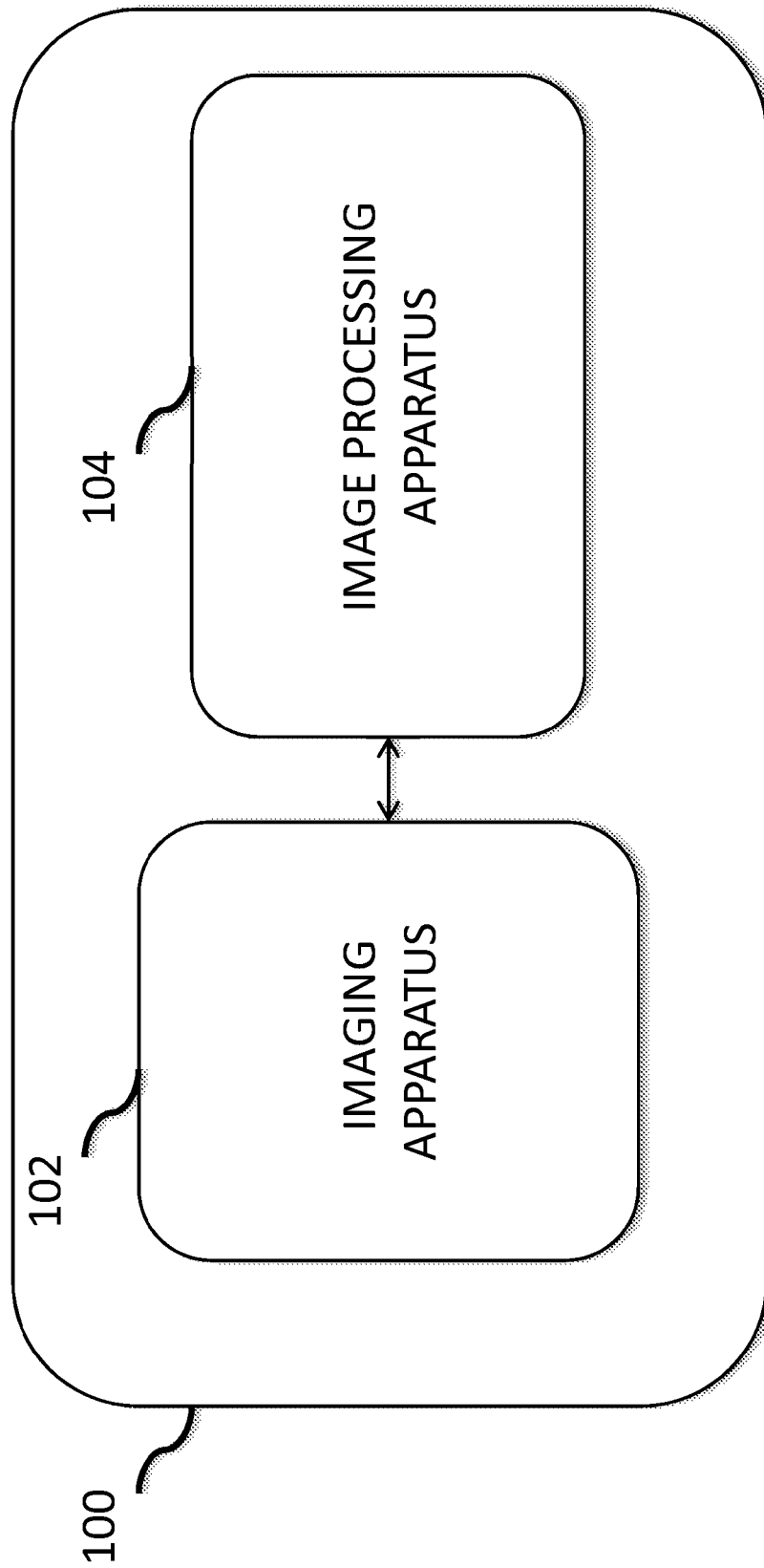
FIGS. 1A and 1B illustrate embodiments of conventional eye based biometric authentication devices.

FIG. 1A illustrates a conventional eye based biometric system 100 comprising an imaging apparatus 102 for acquiring images of a subject's eye coupled with an image processing apparatus 104 for extracting biometric information from acquired images, and optionally analysing such information for the purpose of biometric authentication.

Figure 1B:
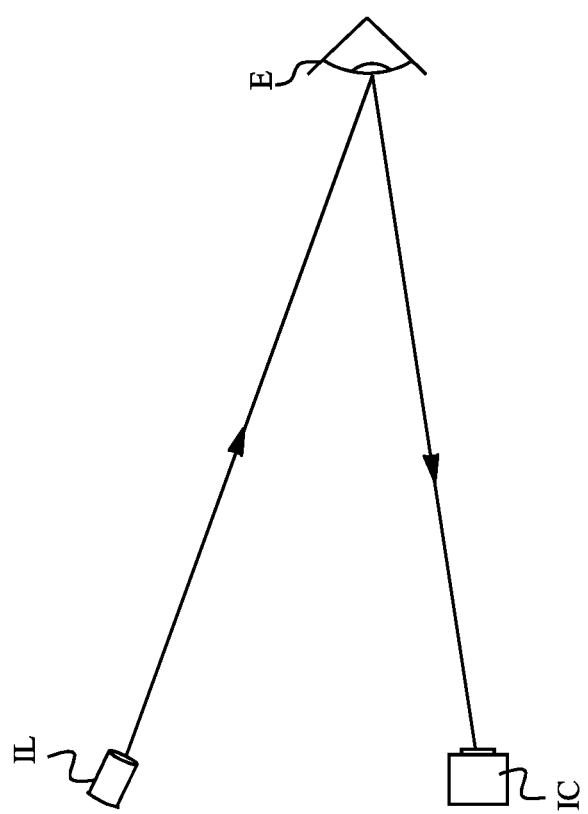

FIG. 1B illustrates a conventional imaging apparatus of the kind more generally illustrated in FIG. 1A, comprising an illuminator IL and imaging camera IC respectively, configured such that illuminating radiations from illuminator IL are scattered off a subject's eye E onto imaging camera IC for image acquisition. In certain embodiments, illuminator IL emits near infrared wavelengths in the range between 700 nm and 1000 nm.

The present invention comprises acquiring one or more images of an eye, and analysing information within the one or more images to detect incidence or evidence of birefringence exhibited by the object which has been imaged. In the event birefringence is detected and/or the detected birefringence is characteristic of the birefringence exhibited by a real eye, the system may conclude that a real eye has been presented for the purposes of biometric authentication. In the event birefringence is not detected, or detected birefringence is not characteristic of birefringence exhibited by a real eye, the system may conclude that a fake eye has been presented for biometric authentication. In an embodiment, the system may generate a score reflecting the magnitude of birefringence, and may apply one or more predefined criteria to determine whether the eye presented for biometric authentication is real or fake.

In an embodiment of the invention, the image processing apparatus of FIG. 1A may be configured to analyze eye images obtained at imaging camera IC to determine whether an acquired eye image exhibits evidence of birefringence (and particularly birefringence in the cornea) and/or whether the detected birefringence is characteristic of the birefringence exhibited by a real eye. Based on this determination, the invention arrives at a conclusion regarding whether the eye presented for imaging is real or fake.

In an embodiment of the invention, (i) if illuminator IL in FIG. 1B is polarized (or can be selectively activated to emit polarized wavelengths) and camera IC has pixels which exhibit responses that vary according to polarization characteristics of incident light (or can be activated in a mode where pixel responses vary according to polarization characteristics of incident light), and (ii) if a specific (or predefined) type of iris pattern(s) or iris texture is observed in images of an eye or iris that are acquired in response to activation of the polarized light source IL and simultaneous activation of polarization of the imaging camera IC—the invention enables the conclusion that the imaged eye is a real eye. If on the other hand, the expected type of iris pattern(s) or iris texture is not observed under the above conditions, the invention enables the conclusion that the imaged eye is a fake eye.

Figure 2:
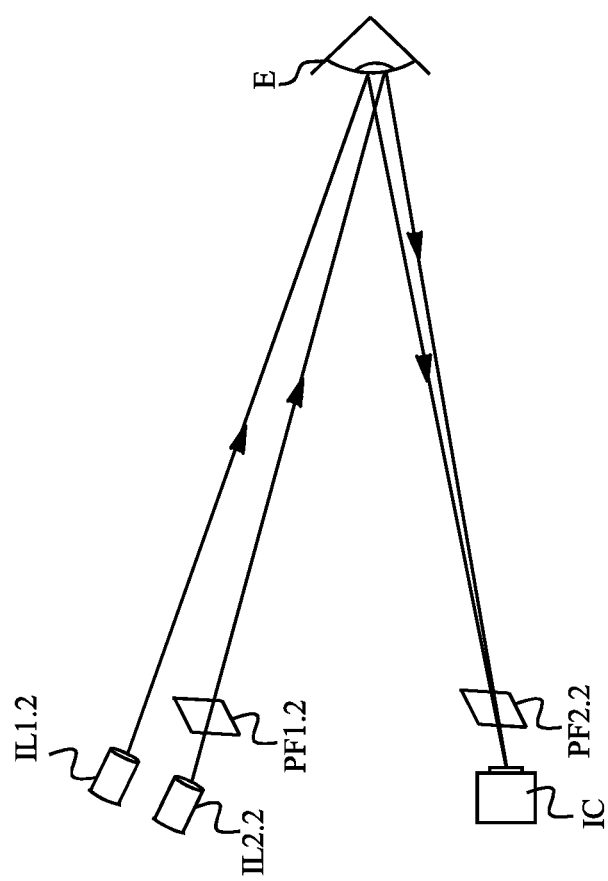
FIGS. 2 to 7 illustrate embodiments of apparatuses and methods in accordance with the present invention.

FIG. 2 illustrates a first embodiment of an imaging apparatus configured for spoof detection—which in a particular embodiment, may be based on detection or evidence of birefringence. In the illustrated embodiment, the imaging apparatus comprises a first illuminator IL1.2 and a second illuminator IL2.2. In an embodiment, the imaging apparatus may have a first polarizing filter PF1.2 interposed in the optical path between the second illuminator IL2.2 and an intended image capture region (e.g. the intersection of the field of view and depth of field corresponding to the imaging camera IC). The imaging apparatus may additionally have a second polarizing filter PF2.2 interposed in the optical path between imaging camera IC and the intended image capture region. The first and second polarizing filters PF1.2 and PF2.2 may be positioned such that light emitted from the second illuminator IL2.2 and that is scattered off the subject's eye E and onto imaging camera IC, passes through both the first and second polarizing filters PF1.2 and PF2.2.

The first and second polarizing filters PF1.2 and PF2.2 may comprise linear polarizers and the angle of polarization of the first polarizing filter and the angle of polarization of the second polarizing filter may be identical. In another embodiment, the first and second polarizing fΩ filters may comprise linear polarizers and the angle of polarization of the first polarizing filter and the angle of polarization of the second polarizing filter may be perpendicular to each other.

It would be understood that second illuminator IL2.2 and first polarizing filter PF1.2 may be combined into a single light source configured to emit polarized light (for example, with a laser light source, laser diode, or any other polarized light source). Likewise, it would be understood that second polarizing filter PF2.2 may be selectively interposed (or activated) or removed (or deactivated), for example in order to improve illumination efficiency and/or camera sensitivity. The polarizing filters PF1.2 and/or PF2.2 may be configured for mechanical, electronic or magnetic interposition/removal or activation/deactivation.

It would be understood that first and second illuminators IL1.2 and IL2.2 may also be positioned such that illumination from each of the first and second illuminators has either (i) an identical angle of incidence upon an object within the image capture region of the imaging camera or (ii) a different angle of incidence upon an object within the image capture region.

In operating the apparatus illustrated in FIG. 2, the invention may acquire a first image of a subject's eye under illumination from first illuminator IL1.2, and may thereafter acquire a second image of the subject's eye under illumination from second illuminator IL2.2. The first and second images may thereafter be analyzed for evidence of birefringence.

Figure 3:
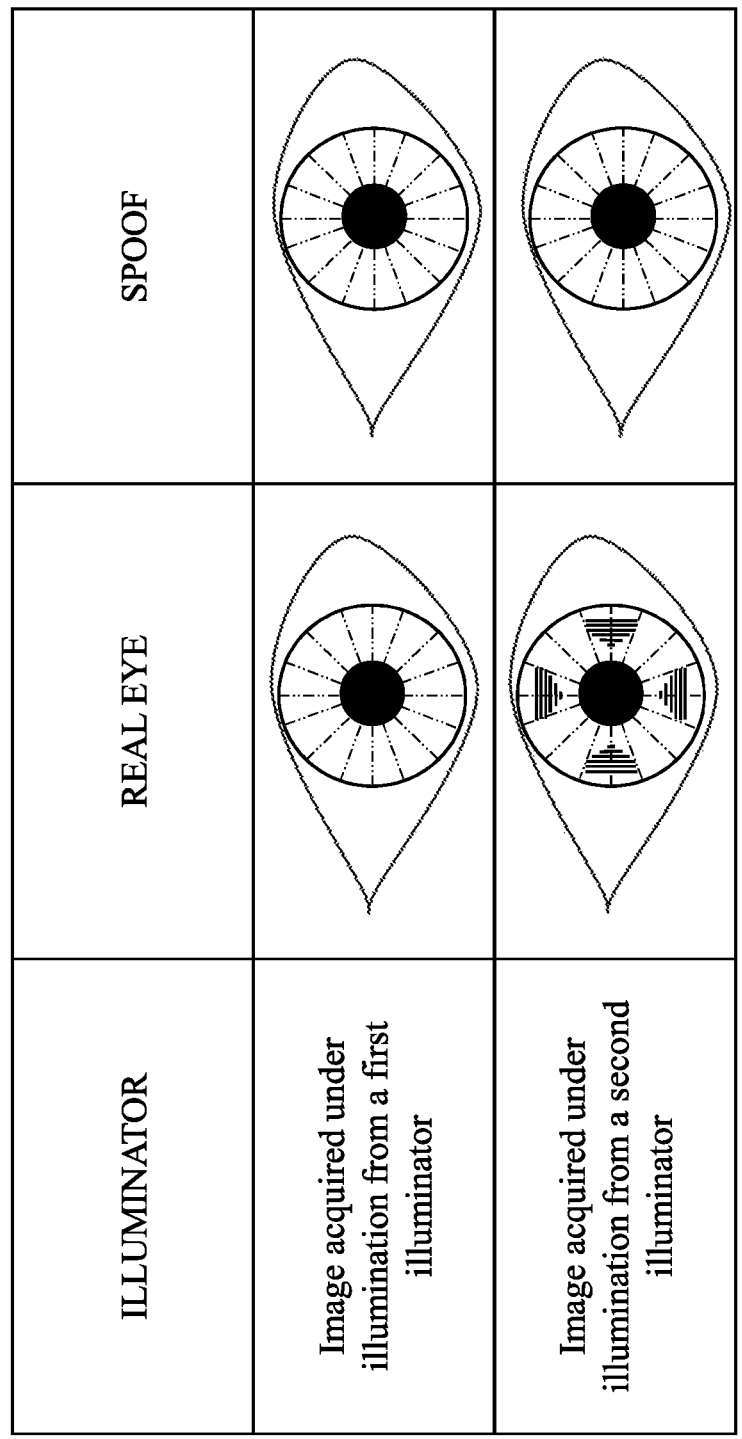

FIG. 3 illustrates exemplary results observed when the apparatus of FIG. 2 was respectively presented with a real eye and a spoof eye. As shown, when presented with a real eye, a second image of an eye acquired under illumination from second illuminator IL2.2 exhibits spots or regions which have different image characteristics or texture in comparison with the same spots or regions in a first image of the same eye that has been acquired under illumination from first illuminator IL1.2. In contrast, when presented with a fake eye, a second image of an eye acquired under illumination from second illuminator IL2.2 is substantially identical in image characteristics to a first image of the same eye that has been acquired under illumination from first illuminator IL1.2.

Accordingly, in an embodiment of the invention (i) evidence of differences in image characteristics between a first image acquired under illumination from a non-polarized light source and a second image acquired under illumination from a polarized light source may be used to conclude that an eye presented for biometric authentication is real, and (ii) evidence of lack of significant differences in image characteristics between a first image acquired under illumination from a non-polarized light source and a second image acquired under illumination from a polarized light source may be used to conclude that an eye presented for biometric authentication is fake.

In an embodiment of the invention, comparison of the first and second images for the purposes of identifying differences between eye images within each of said first and second eye images may be achieved by mapping image data based on polar co-ordinates approximately centred at the iris within an imaged eye, and analysing the image signal along the angular co-ordinates by searching for a periodic component or for a periodically occurring iris pattern or texture that has 4 periods per 360 degrees along angular axis θ (i.e. which periodically occurs with a spatial periodicity of 90 degrees along angular axis θ). The difference in the magnitude and/or phase of this periodic component between the images of an eye acquired under different polarizations may be used to distinguish a real eye from a fake eye.

Figure 4:
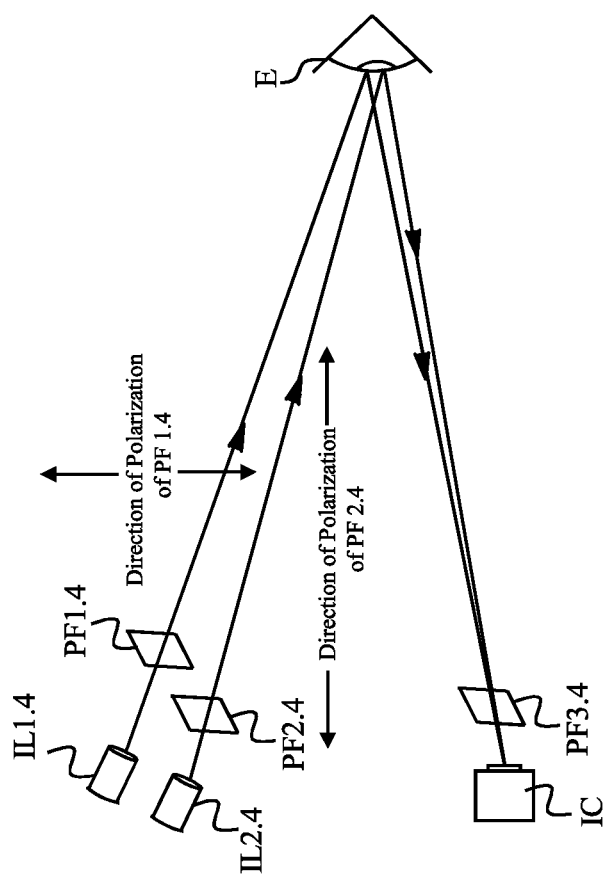

FIG. 4 illustrates a second embodiment of an imaging apparatus configured for spoof detection based on detection or evidence of birefringence. In the illustrated embodiment, the imaging apparatus comprises a first illuminator IL1.4 and a second illuminator IL2.4. In an embodiment the imaging apparatus may have (i) a first polarizing filter PF1.4 interposed in the optical path between the first illuminator IL1.4 and an intended image capture region (ii) a second polarizing filter PF2.4 interposed in the optical path between the second illuminator IL2.4 and an intended image capture region (iii) a third polarizing filter PF3.4 interposed in the optical path between the imaging camera IC and the intended image capture region. In an embodiment, the first and second polarizing filters PF1.4 and PF2.4 may comprise linear polarizers and the angle of polarization of the first polarizing filter PF1.4 and the angle of polarization of the second polarizing filter PF2.4 may be separated by a difference of 90 degrees relative to each other. In an embodiment, the second polarizing filter PF2.4 and the third polarizing filter PF3.4 may comprise linear polarizers, each having an identical angle of polarization.

In the embodiment illustrated in FIG. 4, in order to capture iris images of a real eye without the artefacts introduced by polarization, the two light sources IL1.4 and IL2.4 may be turned on simultaneously and each may be configured to illuminate the image capture region or the object under illumination with substantially the same illumination intensity as the other. Alternatively, the two images acquired under illumination respectively from illuminators IL1.4 and IL2.4 can be combined in processing (in hardware or software) to separate the iris pattern from artefacts or changes introduced in the iris pattern due to polarization.

It would be understood that (i) first illuminator IL1.4 and first polarizing filter PF1.4 may be combined into a single light source configured to emit polarized light or (ii) second illuminator IL2.4 and second polarizing filter PF2.4 may be combined into a single light source configured to emit polarized light. Likewise, it would be understood that third polarizing filter PF3.4 may be omitted entirely in certain embodiments, or may be selectively interposed (or activated) or removed (or deactivated), for example in order to improve illumination efficiency and/or camera sensitivity. The polarizing filters PF1.4, PF2.4 and/or PF3.4 may be configured for mechanical, magnetic or electronic interposition/removal or activation/deactivation.

It would be understood that first and second illuminators IL1.4 and IL2.4 may also be positioned such that illumination from each of said first and second illuminators has either (i) an identical angle of incidence upon an object within the image capture region of the imaging camera or (ii) a different angle of incidence upon an object within the image capture region.

In operating the apparatus illustrated in FIG. 4, the invention may acquire a first image of a subject's eye under illumination from first illuminator IL1.4, and may thereafter acquire a second image of the subject's eye under illumination from second illuminator IL2.4. The first and second images may thereafter be analyzed for evidence of birefringence. As illustrated in the results of FIG. 3, when presented with a real eye, a second image acquired under illumination from second illuminator IL2.4 exhibits spots or regions which have different image characteristics or texture in comparison with the same spots or regions in a first image that has been acquired under illumination from first illuminator IL1.4. In contrast, when presented with a fake eye, a second image acquired under illumination from second illuminator IL2.4 is substantially identical in image characteristics to a first image that has been acquired under illumination from first illuminator IL1.4.

Figure 5:
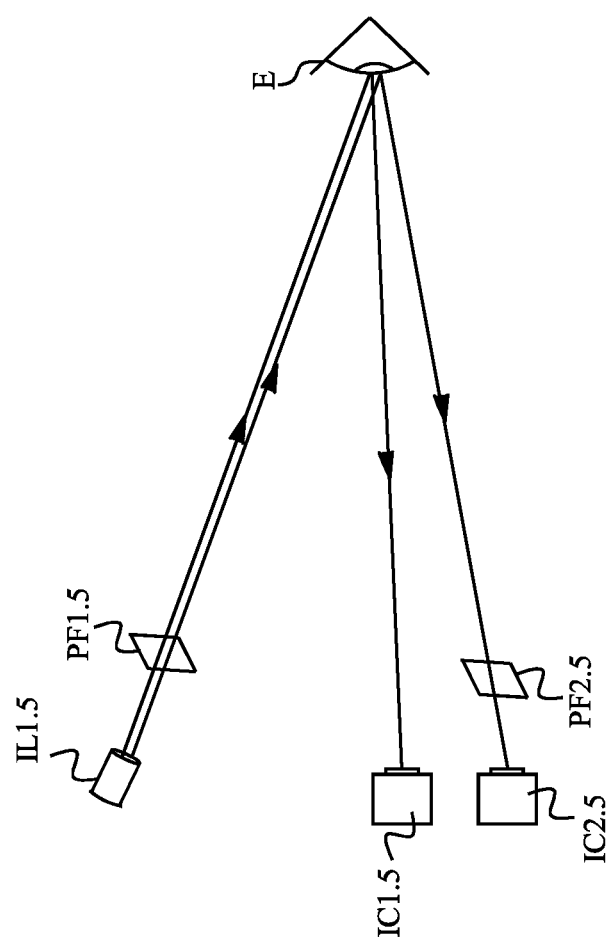

FIG. 5 illustrates a third embodiment of an imaging apparatus configured for spoof detection based on detection or evidence of birefringence. In the illustrated embodiment, the imaging apparatus comprises an illuminator ILLS. The apparatus also comprises a first imaging camera IC1.5 and a second imaging camera IC2.5. The imaging apparatus may have (i) a first polarizing filter PF1.5 interposed in the optical path between illuminator IL1.5 and an intended image capture region and (ii) a second polarizing filter PF2.5 interposed in the optical path between second imaging camera IC2.5 and the intended image capture region. In an embodiment, the first and second polarizing filters PF1.5 and PF2.5 may comprise linear polarizers and the angle of polarization of the first polarizing filter PF1.5 and the angle of polarization of the second polarizing filter PF2.5 may be identical. In an embodiment of FIG. 5, there is no polarizing filter interposed between first imaging camera IC1.5 and the intended image capture region.

In operating the apparatus illustrated in FIG. 5, first imaging camera IC1.5 may acquire a first image of a subject's eye under illumination from illuminator IL1.5, and second imaging camera IC2.5 may acquire a second image of the subject's eye under illumination from illuminator IL1.5. The first and second images may thereafter be analyzed for evidence of birefringence. When presented with a real eye, a second image of an eye acquired at second imaging camera IC2.5 exhibits spots or regions which have different image characteristics or texture in comparison with the same spots or regions in a first image of the same eye that has been acquired by first imaging camera IC1.5. In contrast, when presented with a fake eye, a second image of an eye acquired at second imaging camera IC2.5 is substantially identical in image characteristics to a first image of the same eye that has been acquired by first imaging camera IC1.5.

Figure 6:
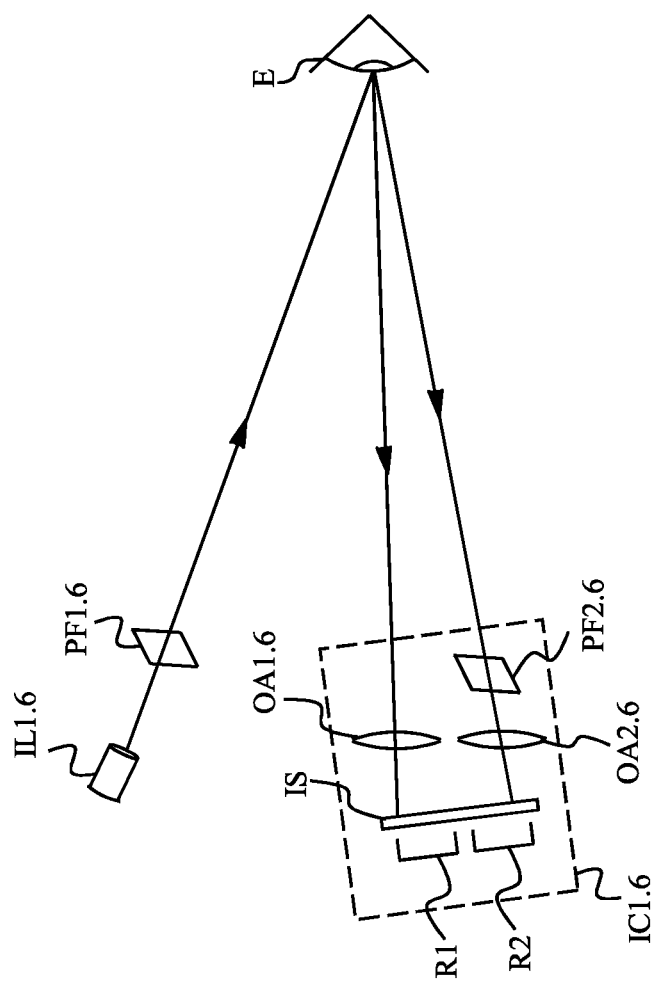

The functionality of FIG. 5 may also be achieved by replacing the two separate image cameras IC1.5 and IC2.5 with a single image camera IC1.6 as illustrated in FIG. 6. FIG. 6 illustrates illuminator IL1.6 having a first polarizing filter PF1.6 interposed between illuminator IL1.6 and the image capture region. Image camera IC1.6 comprises an image sensor IS having a first region R1 and a second region R2. First region R1 of image sensor IS has optical assembly OA1.6 interposed between itself and the image capture region. Second region R2 of image sensor IS has optical assembly OA2.6 and polarizing filter PF2.6 interposed between it and the image capture region. By selectively parsing information from the first and second regions R1 or R2 of image sensor IS, the apparatus of FIG. 6, is capable of generating first and second images that are capable of detecting birefringence in the same manner as first and second imaging cameras IC1.5 and IC2.5 that are shown in FIG. 5.

Figure 7:
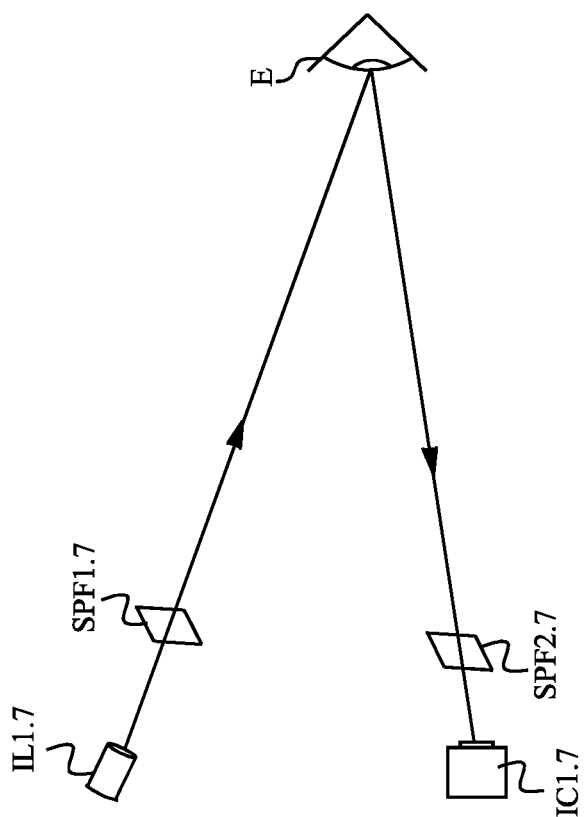

It would be understood that the arrangements of FIGS. 2, 4, 5 and 6 (which are based on multiple illuminators or multiple imaging apparatuses/optical assemblies) may be replaced with the arrangement of FIG. 7, comprising a single illuminator IL1.7 and a single imaging camera IC1.7, wherein at least one of the polarizers SPF1.7 and SPF2.7 is selectively activatable (or interposable). A first image of a subject's eye may be acquired while at least one of the selectively activatable or interposable polarizing filters is activated/interposed in the optical path, while a second image of the subject's eye may be acquired while at least one of the selectively activatable polarizing filters is deactivated or removed from the optical path. In another embodiment instead of activating or de-activating, one of the polarizing filters can be re-configured to change the direction of polarization, for example by introducing or activating an element that rotates the polarization plane (e.g. using a liquid crystal). The first and second images may thereafter be analyzed for evidence of birefringence. When presented with a real eye, the second image of an eye exhibits spots or regions which have different image characteristics or texture in comparison with the same spots or regions in the first image of such eye. In contrast, when presented with a fake eye, the second image of an eye is substantially identical in image characteristics to the first image of such eye. The polarizing filters SPF1.7 and/or SPF2.7 may be configured for mechanical, electronic or magnetic interposition/removal/activation/deactivation/change in angle of polarization.

It would also be understood in each of the above discussed embodiments, that polarizing filters interposed between the image capture region and an imaging camera may be entirely removed in cases where the imaging camera has an image sensor having (i) at least one set of pixels that has selectivity dependent on light polarization, (ii) and at least one set of pixels where selectivity is independent of light polarization or having a different selectivity to light polarization in comparison with the first set of pixels. By generating an image based on parsing or reading the polarization sensitive pixels, the image sensor serves as an imaging apparatus having a polarizing filter interposed between itself and the image capture region. By generating an image based on parsing or reading the polarization insensitive pixels, the image sensor serves as an imaging apparatus that does not have a polarizing filter interposed between itself and the image capture region.

In an embodiment of the invention, image information corresponding to artefacts introduced and detected in eye images or iris images as a result of (a) illumination by a polarized light source or (b) by selective activation of polarization sensitive pixels within an imaging camera (or both), may be added to template information corresponding to a subject's biometric template—and may be used as the basis for biometric authentication decisions in future biometric testing of the subject's identity.

Likewise, an image sensor within an imaging camera may have a first set of pixels that are sensitive to light at a first angle of polarization and a second set of pixels that are sensitive to light at a second angle of polarization. By generating an image based on parsing or reading the first set of pixels, the image sensor serves as an imaging apparatus having a first type of polarizing filter interposed between itself and the image capture region. By generating an image based on parsing or reading the second set of pixels, the image sensor serves as an imaging apparatus having a second type of polarizing filter interposed between itself and the image capture region.

Figure 8:
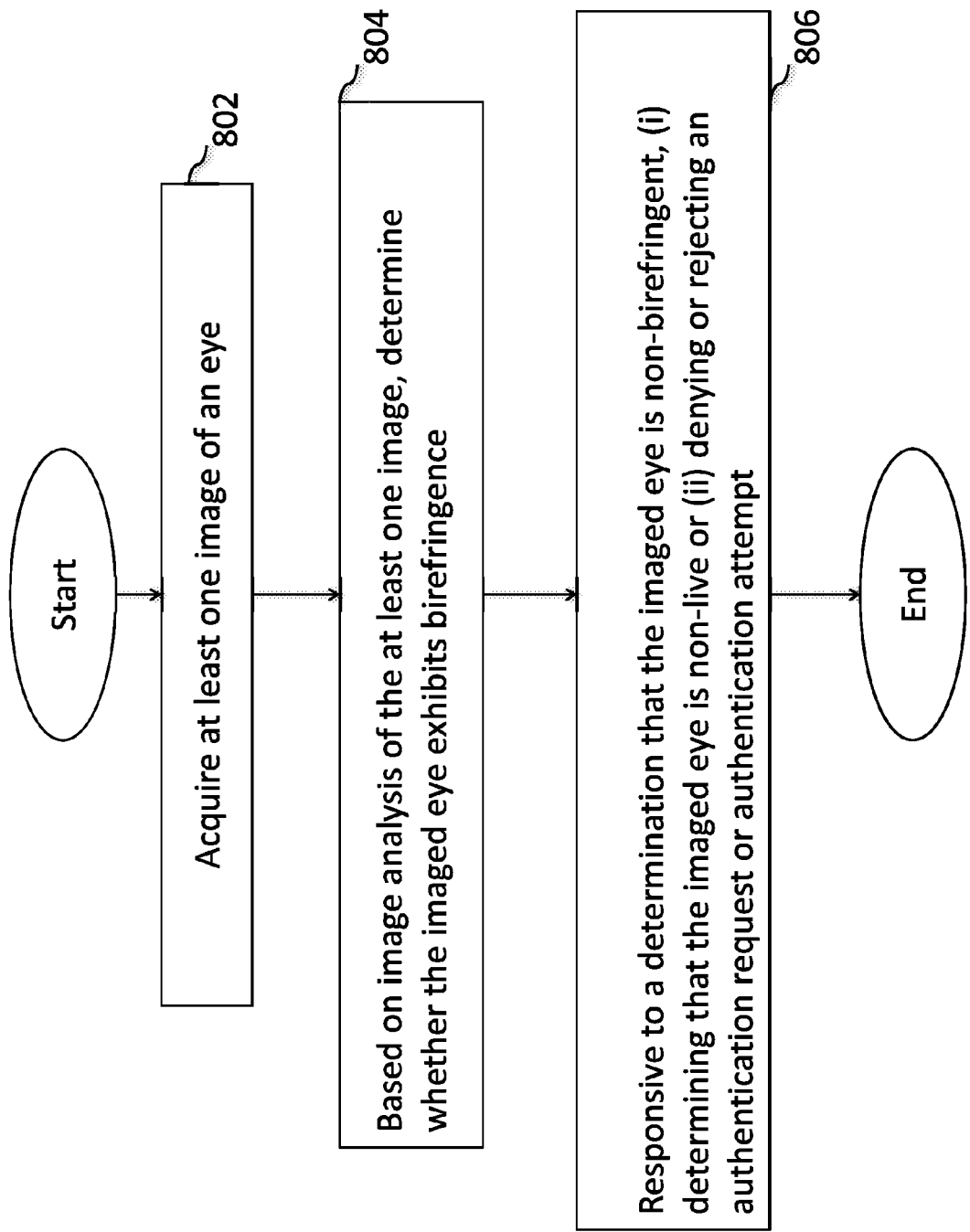

FIG. 8 illustrates a method embodiment of the present invention. Step 802 comprises acquiring at least one eye image of an eye (which image may include either the whole or part of an eye). In an embodiment, in acquiring the at least one image of the eye, the imaged eye is illuminated by polarized light for the purpose of image acquisition. It would be understood that in embodiments of the invention, the at least one image may be acquired through any one or more of the apparatuses described above.

Step 804 comprises determining whether the imaged eye (or part of said imaged eye) exhibits birefringence (i.e. has birefringent properties)—which determination is in an embodiment, based on image analysis of the at least one image of said eye. In an embodiment of the invention, the step 804 image analysis based determination regarding birefringence may be carried out based on differences between image characteristics of images of said eye that arise from different illumination polarizations and/or different angles of incidence of illumination rays generated by illuminators. In an embodiment, the step 804 image analysis based determination regarding birefringence may involve any one or more of the methods, steps or apparatuses described above in connection with FIG. 2, 4, 5, 6 or 7.

Step 806 comprises responding to the birefringence determinations at step 804. In an embodiment of the invention, responsive to a determination that the imaged eye exhibits birefringence characteristic of a real eye (which enables the conclusion that the imaged eye is a real eye and not a spoof or fake), the invention may be configured to select or trigger any response that is appropriate to a determination that the imaged eye is real. For example, the invention may respond by treating the imaged eye as proof of a subject's identity (and therefore to allow an authentication request), or alternatively to treat the imaged eye as evidence of presentation of a real user/subject, and thereafter use biometric information corresponding to such user/subject to enroll biometric templates corresponding to said user, or to use biometric information corresponding to such user/subject for comparisons against previously enrolled biometric templates for the purpose of deciding whether to allow an authentication request or authentication attempt based on presentation of the imaged eye as proof of identity.

In the embodiment illustrated in FIG. 8, step 806 comprises responding to a determination that the imaged eye is non-birefringent (or that the imaged eye exhibits (a) insignificant or unsatisfactory birefringent properties or (b) birefringent properties not characteristic of a real eye or (c) birefringent properties not characteristic of the eye of the specific individual being identified or authenticated)—by selecting or initiating a predefined action. In an embodiment, the predefined action may include any one or more of (i) determining that the imaged eye is non-live, or a spoof or a fake, (ii) denying or rejecting a biometric authentication request or authentication attempt based on the imaged eye, (iii) denying biometric enrollment, (iv) denying access to a resource (including without limitation a mobile communication device, an automobile etc.), (v) denying a request for unlocking of a resource (e.g. a mobile communication device, an automobile or any hardware component or software module), or (vi) transmitting or recording information identifying a spoof. In a specific embodiment, the predefined action comprises denying access to a mobile communication device or an automobile, or any hardware component or software module.

In another embodiment, step 806 comprises selecting a system response, wherein said selection depends on (i) whether the at least part of an eye exhibits birefringent characteristics that are inconsistent with a predefined set of birefringent characteristics or (ii) whether the at least part of an eye exhibits a lack of birefringent characteristics typical of a real eye.

Figure 9A:
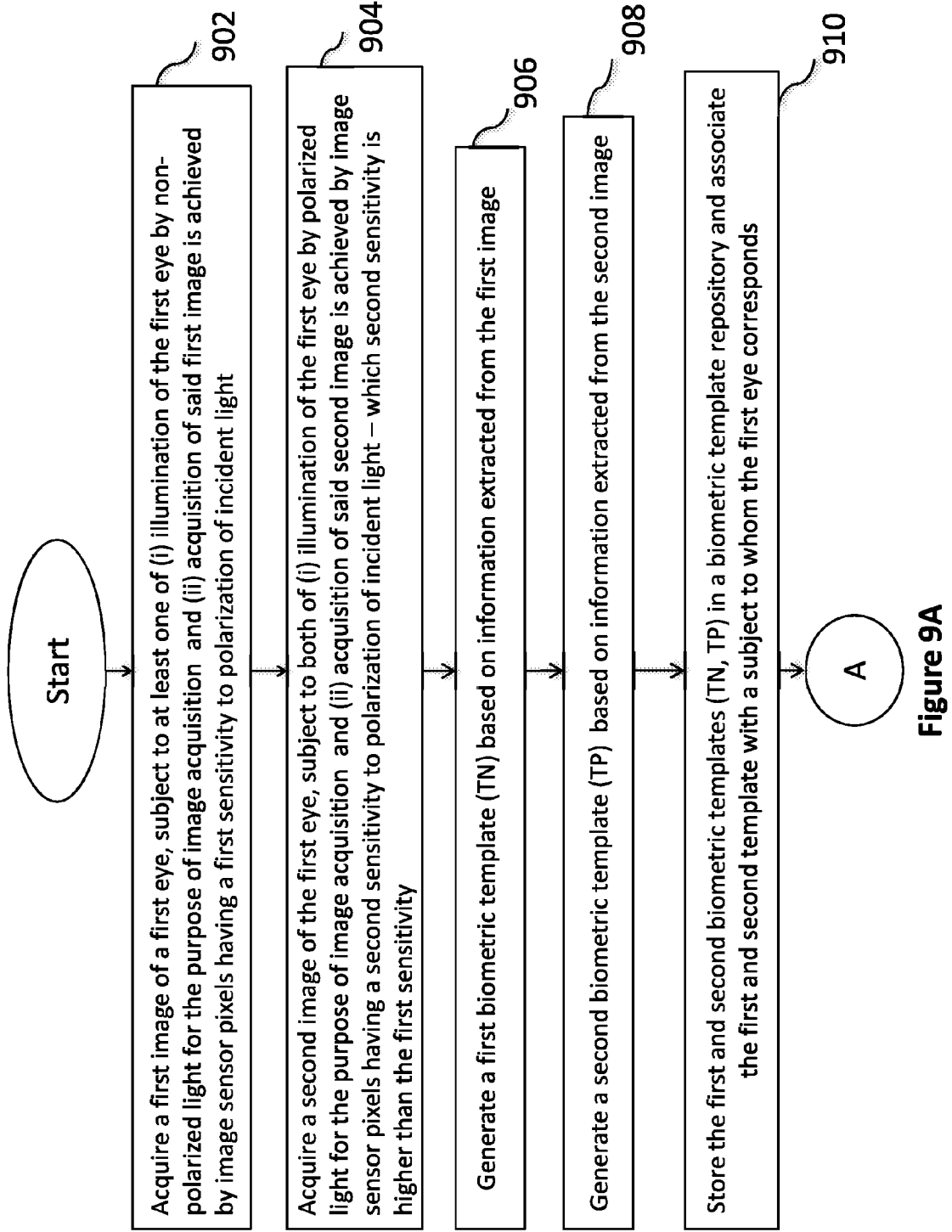
Figure 9B:
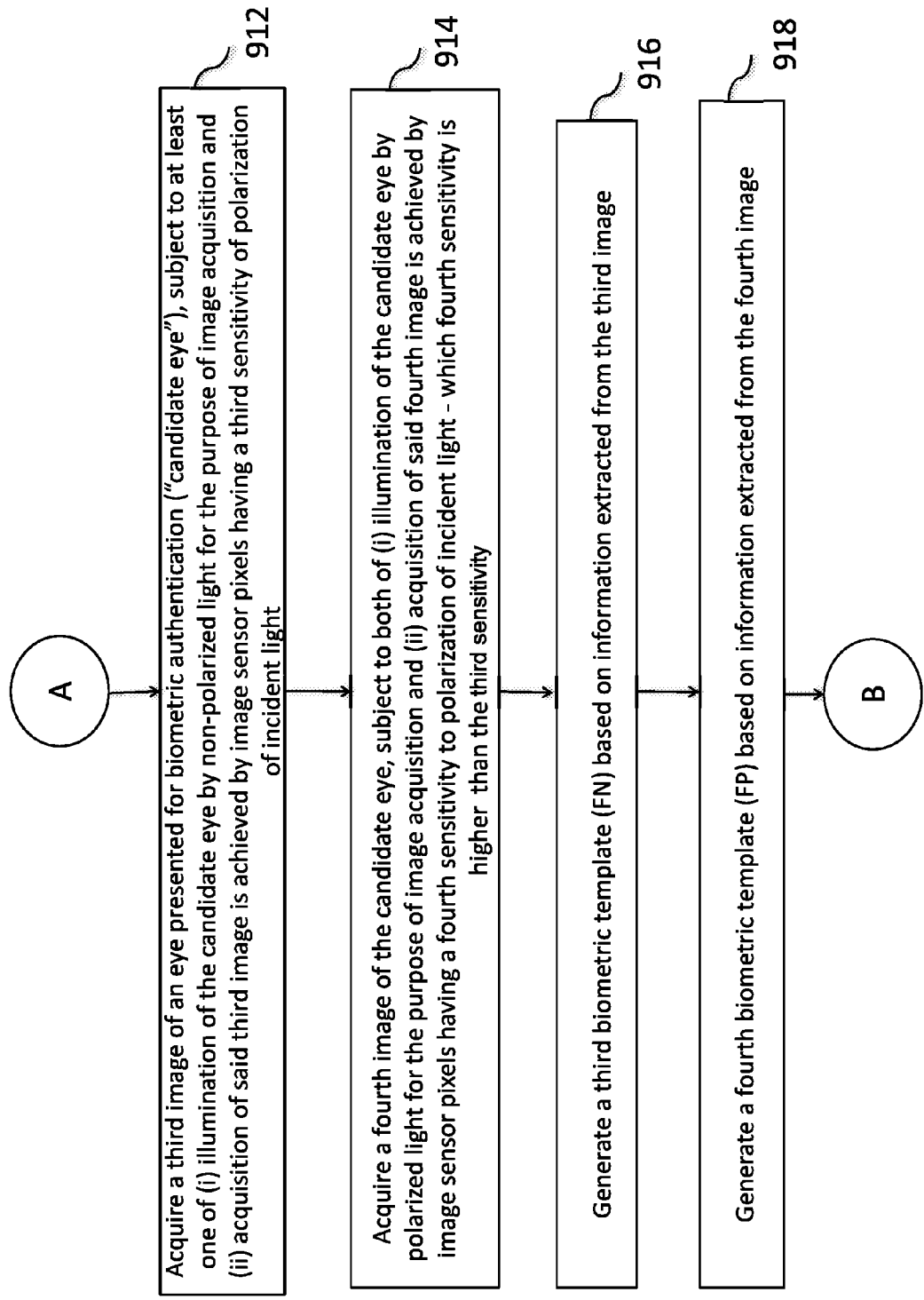

In an embodiment of the invention, image information corresponding to artefacts introduced and detected in eye images or iris images as a result of (a) illumination by a polarized light source or (b) selective activation of polarization sensitive pixels within an imaging camera (or both), may be added to template information corresponding to a subject's biometric template—and may be used as the basis for biometric authentication decisions in future biometric testing of the subject's identity. FIGS. 9A to 9C illustrate a method in accordance with the present invention, which enables addition of image information corresponding to artefacts introduced and detected in eye images or iris images as a consequence of birefringent properties of eye tissues to a subject's biometric template, and which information can be used as the basis for subsequent biometric authentication.

Step 902 comprises acquiring a first image of a first eye at an image sensor. In one embodiment, said image acquisition is subject to at least one of (i) illumination of said first eye by non-polarized light for the purpose of image acquisition or (ii) acquisition of said first image is achieved by image sensor pixels having a first selectivity to polarization characteristics of incident light. In an embodiment, said image sensor pixels may be insensitive to, or insignificantly sensitive to polarization of incident light.

Step 904 comprises acquiring a second image of the first eye. In an embodiment, said image acquisition is subject to both of (i) illumination of the first eye by polarized light for the purpose of image acquisition and (ii) acquisition of said second image is achieved by image sensor pixels having a second selectivity to polarization characteristics of incident light—which second selectivity is higher than the first selectivity. In an embodiment, said image sensor pixels may be sufficiently sensitive to polarization characteristics of incident light to enable capture of eye images which includes artefacts introduced by polarization of incident light.

Step 906 comprises acquiring or generating a first set of image information (TN) corresponding to at least part of an eye, wherein the first set of image information excludes image information corresponding to artefacts arising from birefringence in a real cornea. In an embodiment, the first set of image information is generated based on information extracted from the first image. Step 908 comprises acquiring or generating a second set of image information (TP) corresponding to at least part of an eye, wherein the second set of image information includes image information corresponding to artefacts arising from birefringence in a real cornea. In an embodiment, the second set of image information is generated based on information extracted from the second image. Step 910 thereafter comprises storing the first and second sets of biometric information/first and second biometric templates (TN, TP) in a biometric template repository and/or associating the first and second sets of image information with a subject to whom the first eye corresponds.

In an embodiment of the invention, the first set of image information (TN) and the second set of image information (TP) may be derived from the same image. In a specific embodiment, the first set of image information (TN) and the second set of image information (TP) are derived from the same image by image processing.

Step 912 comprises acquiring a third image corresponding to an eye (or part of an eye) presented for biometric authentication (i.e. a "candidate eye"). In an embodiment, the third image is acquired or generated subject to at least one of (i) illumination of the candidate eye by non-polarized light for the purpose of image acquisition and (ii) acquisition of said third image is achieved by image sensor pixels having a third selectivity to polarization characteristics of incident light. In an embodiment, said image sensor pixels may be insensitive to, or insignificantly sensitive to polarization characteristics of incident light.

Step 914 comprises acquiring a fourth image corresponding to the candidate eye. In an embodiment, said fourth image is acquired or generated, subject to both of (i) illumination of the candidate eye by polarized light for the purpose of image acquisition and (ii) acquisition of said fourth image is achieved by image sensor pixels having a fourth selectivity to polarization of incident light—which fourth selectivity is higher than the third selectivity. In an embodiment, said image sensor pixels may be sufficiently sensitive to polarization characteristics of incident light to enable capture of eye images which includes artefacts introduced by polarization of incident light.

Step 916 comprises acquiring or generating a third set of image information (FN) corresponding to at least part of an eye, wherein the third set of image information excludes image information corresponding to artefacts arising from birefringence in a real cornea. In an embodiment, the third set of image information is extracted from the third image. Step 918 comprises generating or acquiring a fourth set of image information (FP) corresponding to at least part of an eye, wherein the fourth set of image information includes image information corresponding to artefacts arising from birefringence in a real cornea. In an embodiment, the fourth set of image information may be extracted from the fourth image.

Step 920 comprises comparing, or scoring intra-pair similarities corresponding to, at least two of the following pairs:

(i) a first pair (TN, FN) comprising the first set of image information (TN) and the third set of image information (FN); (ii) a second pair (TN, FP) comprising the first set of image information (TN) and the fourth set of image information (FP); (iii) a third pair (TP,FN) comprising the second set of image information (TP) and the third set of image information (FN); (iv) a fourth pair (TP,FP) comprising the second set of image information (TP) and the fourth set of image information (FP); (v) a fifth pair (TN,TP) comprising the first set of image information (TN) and the second set of image information (TP); and (vi) a sixth pair (FN, FP) comprising the third set of image information (FN) and the fourth set of image information (FP).

Step 922 comprises using the comparisons or similarity scores generated at step 920, for (i) determining whether the candidate eye is live or non-live or (ii) generating a positive identity match decision (i.e. a match decision) between the candidate eye and the biometric templates TN and/or TP or (iii) generating a negative identity match decision (i.e. a non-match decision) between the candidate eye and the biometric templates TN and/or TP or (iv) denying or rejecting an authentication request or authentication attempt based on the candidate eye.

In a preferred embodiment of the method, step 920 comprises:
  determining a similarity score (A) representative of intra-pair similarities corresponding to first pair (TN, FN);
  determining a similarity score (B) representative of intra-pair similarities corresponding to third pair (TP, FN);
  determining a similarity score (C) representative of intra-pair similarities corresponding to second pair (TN, FP);

In a preferred embodiment of the method, step 922 additionally comprises one or more of:
  determining that the candidate eye is non-live (i.e. a spoof or fake) if similarity score (C) exceeds a predetermined threshold score;
  generating a positive identity match decision between the candidate eye and the biometric templates if at least one (and preferably both) of the following is satisfied (i) A is greater than T (i.e. A>T) and (ii) the sum of C and D is less than the smaller of A and B (i.e. (C+D)<minimum of (A, B))—where T and D are predefined threshold values respectively, and preferably are non-negative values (i.e. (i) D≥0, and/or (ii) T≥0);
  generating a negative identity match decision between the candidate eye and the biometric templates, or denying or rejecting an authentication request or authentication attempt based on the candidate eye, if at least one (and preferably both) of the following is not satisfied (i) A is greater than T (i.e. A>T) and (ii) the sum of C and D is less than the smaller of A and B (i.e. (C+D)<minimum of (A, B))—where T and D are predefined threshold values respectively, and preferably are non-negative values (i.e. (i) D≥0, and/or (ii) T≥0).

In various embodiments of the invention, non-polarized light (for example, non-polarized light used to acquire the first and third images) shall mean light having a degree of polarization of less than 20%.

Additionally, for the purposes of interpreting the term "selectivity" to polarization characteristics of incident light, it would be understood that in case of linear polarizers, selectivity can be defined as the depth of modulation resulting from slowly rotating the polarization plane of a linearly polarized beam with 100% degree of polarization of constant intensity. This definition may be generalized or expanded appropriately for circular and elliptical polarizers as well.

In an embodiment of the invention, one or both of the first selectivity and third selectivity to polarization characteristics of incident light (see steps 902 and 912 of FIG. 9) may be less than 20%.

In addition to the above described apparatuses and methods, the invention additionally provides computer program products configured for implementing the methods of the present invention. A computer program product in accordance with the present invention may comprise computer readable instructions stored on a transitory or non-transitory computer readable medium, and may include instructions for implementing one or more methods in accordance with the teachings of the present invention.

Figure 10:
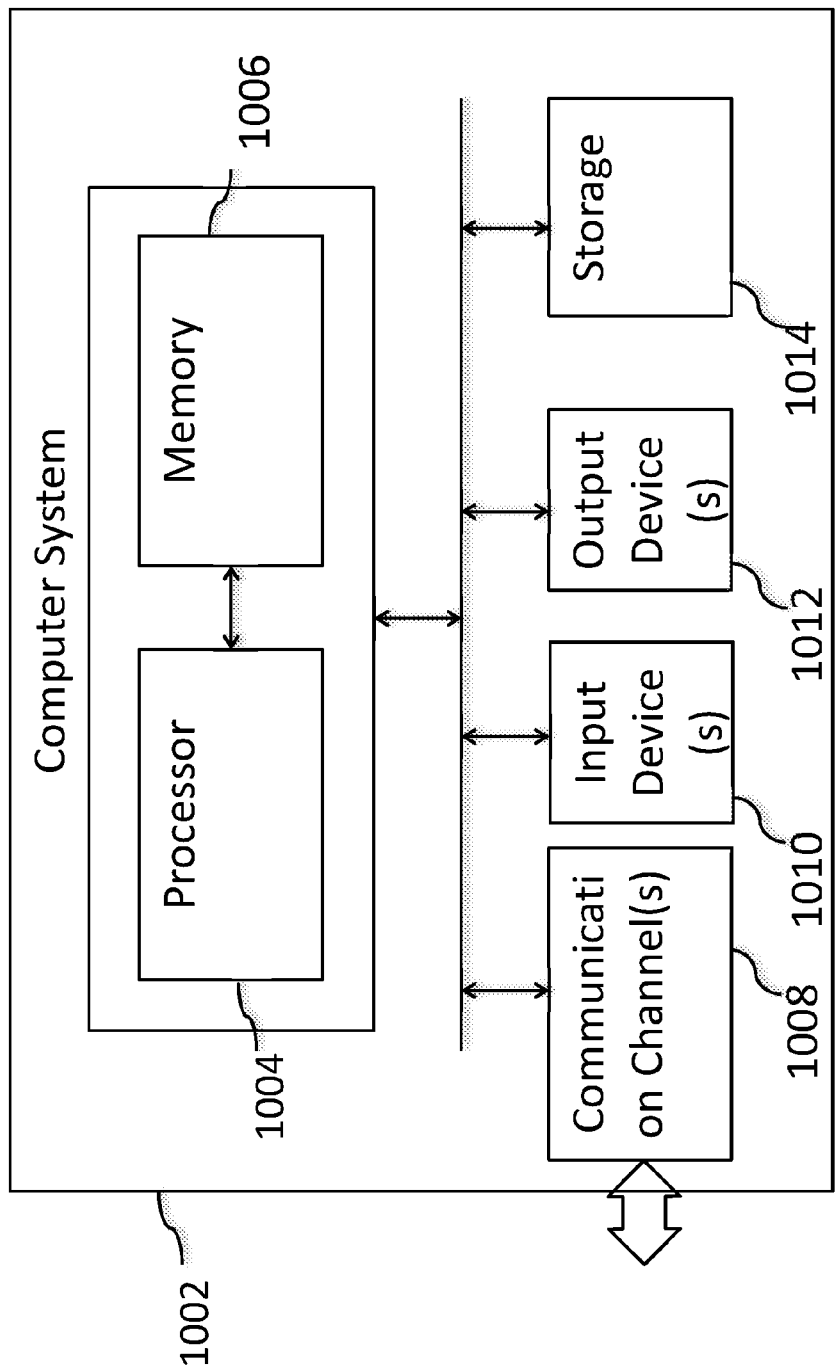
FIG. 10 illustrates a system for implementation of various embodiments in accordance with the present invention.

FIG. 10 illustrates an exemplary computing system for implementing the present invention.

The computing system 1002 comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions which is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

It would be understood that the systems, methods and computer programs of the present invention may be implemented in any number of ways. The methods, apparatuses and computer programs discussed below are merely exemplary and are not intended to be understood as being limiting.

The invention claimed is:

1. A method for selecting a system response based on characteristics of acquired biometric information, comprising the steps of:
receiving a first iris image representing at least part of an iris, wherein said first iris image is acquired based on illumination received at an image sensor through a first configuration of optical elements, said first configuration of optical elements having a first set of polarizing properties;
receiving a second iris image representing said part of the iris, wherein said second iris image is acquired based on illumination received at an image sensor through a second configuration of optical elements, said second configuration of optical elements having a second set of polarizing properties that are different from the first set of polarizing properties;
determining birefringent characteristics of at least part of the iris, wherein said determination of birefringent characteristics is based on one or more identified differences between the first iris image and the second iris image;
selecting a system response, wherein said selection depends on (i) whether the birefringent characteristics that are determined based on identified differences between the first iris image and the second iris image, being inconsistent with a predefined set of birefringent characteristics or (ii) whether the identified differences between the first iris image and the second iris image establish a lack of birefringent characteristics typical of a real iris.

2. The method as claimed in claim 1, wherein:
one of the first iris image or the second iris image is acquired by an image sensor comprising pixels exhibiting selectivity to polarization characteristics of incident light.

3. The method as claimed in claim 1, wherein:
the illumination received through the second configuration of optical elements comprises (i) unpolarized illumination, (ii) partially polarized illumination or (iii) linearly polarized illumination that is orthogonal to polarization of illumination received through the first configuration of optical elements.

4. A method for initiating an action based on characteristics of acquired biometric information, comprising the steps of:
receiving a first iris image representing an image of at least part of an iris, wherein the first iris image is acquired based on illumination received at an image sensor through a first configuration of optical elements, said first configuration of optical elements having a first set of polarizing properties;
receiving a second iris image representing said part of the iris, wherein said second iris image is acquired based on illumination received at an image sensor through a second configuration of optical elements, said second configuration of optical elements having a second set of polarizing properties that are different from the first set of polarizing properties;
determining birefringent characteristics of at least part of the iris, wherein said determination of said birefringent characteristics is based on one or more identified differences between the first iris image and the second iris image; and
initiating a predefined action responsive to (i) the birefringent characteristics that are determined based on identified differences between the first iris image and the second iris image, being inconsistent with a predefined set of birefringent characteristics or (ii) a determination that the identified differences between the first iris image and the second iris image establish a lack of birefringent characteristics typical of a real iris.

5. The method as claimed in claim 4, wherein the predefined action comprises any one or more of denying biometric enrollment, denying biometric authentication, denying access to a resource, denying a request for unlocking of a resource, or transmitting or recording information identifying a spoof.

6. The method as claimed in claim 4, wherein the predefined action comprises denying access to a computing device, a mobile communication device or an automobile, or any hardware component or software module thereof.

7. The method as claimed in claim 4, wherein one of the first iris image and the second iris image is acquired through an image sensor comprising pixels exhibiting selectivity to polarization characteristics of incident light.

8. The method as claimed in claim 4, wherein:
the illumination received through the second configuration of optical elements comprises (i) unpolarized illumination, (ii) partially polarized illumination or (iii) linearly polarized illumination that is orthogonal to polarization of illumination received through the first configuration of optical elements.

9. A method for biometric authentication or identification comprising:
retrieving at least one of:
(i) a first set of image information (T1) representing an image of at least part of a first iris, wherein said first set of image information is acquired based on illumination received at an image sensor through a first configuration of optical elements, said first configuration of optical elements having a first set of polarizing properties, and wherein said first set of image information includes image information corresponding to artefacts arising from birefringence in a real cornea; and
(ii) a second set of image information (T2) corresponding to said part of the first iris, wherein said second set of image information is acquired based on illumination received at an image sensor through a second configuration of optical elements, said second configuration of optical elements having a second set of polarizing properties that are different from the first set of polarizing properties;
receiving a third set of image information (F3) corresponding to at least part of a second iris, wherein the third set of image information is acquired based on illumination received at an image sensor through a configuration of optical elements having the first set of polarizing properties;
receiving a fourth set of image information (F4) corresponding to said part of the second iris, wherein said fourth set of image information is acquired based on illumination received at an image sensor through a configuration of optical elements having the second set of polarizing properties; and
generating at least one of an identity decision or authentication decision based on intra-pair comparisons between sets of image informations within at least two of the following pairs of sets of image information: (i) a first image information pair (T2, F4) comprising the second set of image information and the fourth set of image information (F4); (ii) a second image information pair (T2, F3) comprising the second set of image information and the third set of image information (F3); (iii) a third image information pair (T1, F4) comprising the first set of image information (T1) and the fourth set of image information (F4); (iv) a fourth image information pair (T1, F3) comprising the first set of image information (T1) and the third set of image information (F3); (v) a fifth image information pair (T2, T1) comprising the second set of image information (T2) and the first set of image information (T1); and (vi) a sixth image information pair (F4, F3) comprising the fourth set of image information (F4) and the third set of image information (F3).

10. The method as claimed in claim 9, wherein the generated identity decision or authentication decision is based on one or more of:
determining a score (A) representative of intra-pair similarities corresponding to the first image information pair (T2, F4);
determining a score (B) representative of intra-pair similarities corresponding to the third image information pair (T1, F4); and
determining a score (C) representative of intra-pair similarities corresponding to the second image information pair (T2, F3).

11. The method as claimed in claim 10, further comprising the step of (i) rejecting an authentication request or (ii) failing authentication responsive to any one or more of:
score (C) exceeding a predetermined threshold score; and
non-occurrence of one or more of the following conditions:
(i) A>T; and
(ii) (C+D)<E, wherein E corresponds to the minimum value among A and B;
wherein T and D respectively comprise predefined threshold values;
and wherein A, B and C are similarity scores.

12. The method as claimed in claim 11, wherein (i) D≥0, or (ii) T≥0.

13. A method for selecting a system response based on characteristics of acquired biometric information, comprising the steps of:
receiving a first set of iris image information representing at least part of an iris from a first set of image sensor pixels having a first selectivity dependent on light polarization;
receiving a second set of iris image information representing at least part of the iris from a second set of image sensor pixels, wherein said second set of image sensor pixels (i) has a second selectivity dependent on light polarization that is different from the first selectivity based on light polarization, or (ii) is non-selective to light polarization;
determining birefringent characteristics of at least part of the iris, wherein said determination of birefringent characteristics is based on one or more identified differences between the first set of iris image information and the second set of iris image information;
selecting a system response, wherein said selection depends on (i) whether the birefringent characteristics that are determined based on identified differences between the first set of iris image information and the second set of iris image information, being inconsistent with a predefined set of birefringent characteristics or (ii) whether the identified differences between the first set of eye image information and the second set of eye image information establish a lack of birefringent characteristics typical of a real eye.

* * * * *